(12) United States Patent
Tabet et al.

(10) Patent No.: US 11,546,892 B2
(45) Date of Patent: Jan. 3, 2023

(54) RADIO ACCESS TECHNOLOGY WITH NON-CONTINUOUS AND PERIODIC PUSCH TRANSMISSION

(71) Applicant: Apple Inc., Cupertino, CA (US)

(72) Inventors: Tarik Tabet, Los Gatos, CA (US); Syed Aon Mujtaba, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 421 days.

(21) Appl. No.: 16/057,906

(22) Filed: Aug. 8, 2018

(65) Prior Publication Data

US 2018/0352547 A1    Dec. 6, 2018

Related U.S. Application Data

(63) Continuation of application No. 14/817,850, filed on Aug. 4, 2015, now Pat. No. 10,064,164.

(Continued)

(51) Int. Cl.
*H04W 72/04* (2009.01)
*H04W 76/28* (2018.01)
(Continued)

(52) U.S. Cl.
CPC ....... *H04W 72/0413* (2013.01); *H04L 1/1812* (2013.01); *H04L 1/1819* (2013.01);
(Continued)

(58) Field of Classification Search
CPC ... H04L 1/1812; H04L 5/0048; H04L 5/0055; H04L 27/2614; H04L 1/1887;
(Continued)

(56) References Cited

U.S. PATENT DOCUMENTS 8,289,895 B2    10/2012    Yu et al.
2009/0125774 A1    5/2009    Kim et al.
(Continued)

FOREIGN PATENT DOCUMENTS

CN    1010645760    2/2010
CN    101682488 A    3/2010
(Continued)

OTHER PUBLICATIONS

Notice of Allowance, Japanese Patent Application No. 2017-097477, dated Aug. 13, 2018, three pages.
(Continued)

*Primary Examiner* — Oussama Roudani
(74) *Attorney, Agent, or Firm* — Kowert, Hood, Munyon, Rankin & Goetzel, P.C.

(57) ABSTRACT

A user equipment (UE) and base station may implement improved communication methods which enable a UE that is peak current limited to perform UL transmissions which are consistent with the UL timeline. A UE that is peak current limited may utilize a new form of distributed TTI (transmit time interval) bundling for improved uplink communication performance. In performing "distributed" TTI bundling, the UE may transmit a plurality of redundancy versions of first information to the base station, wherein the plurality of redundancy versions are transmitted in non-consecutive sub-frames with a periodicity of X ms. After the plurality of redundancy versions of first information are transmitted to the base station, the base station may provide a single acknowledge/negative acknowledge (ACK/NACK) to the UE. A method for dynamically generating and using a bundle size for TTI bundling is also disclosed.

20 Claims, 9 Drawing Sheets

Related U.S. Application Data

(60) Provisional application No. 62/038,488, filed on Aug. 18, 2014.

(51) Int. Cl.
  *H04L 1/18* (2006.01)
  *H04L 5/00* (2006.01)
  *H04L 27/26* (2006.01)
  *H04L 1/16* (2006.01)

(52) U.S. Cl.
  CPC .......... *H04L 1/1887* (2013.01); *H04L 5/0048* (2013.01); *H04L 5/0055* (2013.01); *H04L 5/0092* (2013.01); *H04L 27/2614* (2013.01); *H04W 76/28* (2018.02); *H04L 1/1635* (2013.01); *H04L 5/0044* (2013.01); *Y02D 30/70* (2020.08)

(58) Field of Classification Search
  CPC ... H04L 5/0092; H04L 1/1819; H04L 5/0044; H04L 1/1635; H04W 72/0413; H04W 76/048
  See application file for complete search history.

(56) References Cited

U.S. PATENT DOCUMENTS

| | | |
|---|---|---|
| 2009/0257408 A1 | 10/2009 | Zhang |
| 2010/0192035 A1 | 7/2010 | Sagfors |
| 2011/0310777 A1 | 12/2011 | Jiang et al. |
| 2012/0020309 A1 | 1/2012 | Malladi et al. |
| 2013/0242824 A1 | 9/2013 | Lee |
| 2013/0343273 A1 | 12/2013 | Barbieri et al. |
| 2014/0362832 A1* | 12/2014 | Rudolf .................. H04L 1/1822 370/336 |
| 2015/0039958 A1* | 2/2015 | Vos ........................ H04L 1/1864 714/748 |
| 2015/0109986 A1* | 4/2015 | Siomina .............. H04W 72/005 370/312 |
| 2015/0237644 A1 | 8/2015 | Golitschek Edler von Elbwart et al. |
| 2015/0280876 A1 | 10/2015 | You |
| 2016/0174256 A1* | 6/2016 | Ratasuk .............. H04W 74/004 370/329 |
| 2017/0085360 A1* | 3/2017 | Lee ........................ H04B 1/50 |

FOREIGN PATENT DOCUMENTS

| | | |
|---|---|---|
| JP | 2010530709 | 9/2010 |
| WO | 2014077577 A | 5/2014 |
| WO | 2014110725 A1 | 7/2014 |
| WO | WO2015018680 A1 | 2/2015 |

OTHER PUBLICATIONS

Office Action for Japanese Patent Application No. 2015-160684, dated Aug. 2, 2016, pp. 1-9.

Office Action, Chinese Application No. 201510508205.5, dated Mar. 20, 2018, 14 pages.

First Office Action for Chinese Patent Application No. 201910173635.4; 8 pages; dated Mar. 9, 2022.

* cited by examiner

| Bundle Transmission | | | | | | | | | | | | | | | | Bundle Re-transmission | | | |
|---|---|---|---|---|---|---|---|---|---|---|---|---|---|---|---|---|---|---|---|
| TTI # | 0 | 1 | 2 | 3 | 4 | 5 | 6 | 7 | 8 | 9 | 10 | 11 | 12 | 13 | 14 | 15 | 16 | 17 | 18 | 19 |
| HARQ Process# | 0 | 0 | 0 | 0 | | | | | | | | | | | | | 0 | 0 | 0 | 0 |
| RV | 0 | 2 | 3 | 1 | | | | | | | | | | | | | 0 | 2 | 3 | 1 |
| ACK/NACK | | | | | | | | NACK | | | | | | | | | | | | |

FIG. 5 (Prior Art)

| TTI # | 0 | 1 | 2 | ••• | X-1 | X | X+1 | ••• | 2X-1 | 2X | 2X+1 | ••• | 3X-1 | 3X | 3X+1 | ••• | 4X-1 | 4X | ••• |
|---|---|---|---|---|---|---|---|---|---|---|---|---|---|---|---|---|---|---|---|
| HARQ Process# | 0 | | | | 0 | | | | 0 | | | | 0 | | | | 1 | | |
| RV | 0 | | | | 2 | | | | 3 | | | | 1 | | | | 0 | | |
| ACK/NACK | | | | | | | | | | | | | | | NACK | | | | |

*FIG. 7*

RADIO ACCESS TECHNOLOGY WITH NON-CONTINUOUS AND PERIODIC PUSCH TRANSMISSION

PRIORITY DATA

This application is a continuation of U.S. patent application Ser. No. 14/817,850, titled "Radio Access Technology with Non-Continuous and Periodic PUSCH Transmission" filed Aug. 4, 2015, by Tarik Tabet and Syed Aon Mujtaba, which claims benefit of priority to U.S. Provisional Application Ser. No. 62/038,488, titled "Non-Continuous and Periodic PUSCH Transmission" filed on Aug. 18, 2014, by Tarik Tabet and Syed Aon Mujtaba, which is all hereby incorporated by reference in their entirety as though fully and completely set forth herein.

The claims in the instant application are different than those of the parent application or other related applications. The Applicant therefore rescinds any disclaimer of claim scope made in the parent application or any predecessor application in relation to the instant application. The Examiner is therefore advised that any such previous disclaimer and the cited references that it was made to avoid, may need to be revisited. Further, any disclaimer made in the instant application should not be read into or against the parent application or other related applications.

FIELD

The present application relates to wireless communication, and more particularly, to performing discontinuous and periodic physical uplink shared channel (PUSCH) transmissions in a radio access technology such as LTE.

DESCRIPTION OF THE RELATED ART

Wireless communication systems are rapidly growing in usage. Additionally, there exist numerous different wireless communication technologies and standards. Some examples of wireless communication standards include GSM, UMTS (WCDMA, TDS-CDMA), LTE, LTE Advanced (LTE-A), HSPA, 3GPP2 CDMA2000 (e.g., 1×RTT, 1×EV-DO, HRPD, eHRPD), IEEE 802.11 (WLAN or Wi-Fi), IEEE 802.16 (WiMAX), Bluetooth, etc.

In cellular radio access technologies (RATs) such as LTE, the user equipment (UE) requests uplink (UL) resources by means of a scheduling request (SR). In response to a SR, the eNB (base station) assigns UL resources to the UE with a UL grant. The eNB can assign resources to the UE on every sub-frame. After the UE receives a UL grant, the UE can transmit data to the eNB on the physical uplink shared channel (PUSCH).

Hybrid automatic repeat request (HARQ) is a technique used by a receiver to detect a corrupted message and to request a new message from the sender. In LTE the UL HARQ is synchronous, i.e., if the UL grant for the initial transmission is received by the UE at t=0, the UL transmission on PUSCH occurs at t=4, the ACK/NACK feedback occurs on t=8 and the HARQ retransmission occurs on t=12. In order to obtain a grant, the UE sends a scheduling request (SR) to the eNB (e.g., at t=0), and the eNB will send a UL grant in the PDCCH at t>=4.

A device which is peak current limited (i.e., a device that has limited battery and/or limited power amplifier capability) is not able to transmit continuously in the UL, e.g., it can transmit only on a low duty cycle. For example, a device which is peak current limited can transmit during one sub-frame and then may remain silent for the next 9 sub-frames. Thus, as one common example, such a device can transmit only in one sub-frame per LTE radio frame. The duty cycle in this case is 10%.

A mechanism is needed to enable UL transmissions in such scenarios and to make sure that the UE can still transmit in the UL without violating the UL timeline. Therefore, improvements in the field would be desirable.

SUMMARY

Embodiments are presented herein of, inter alia, a user equipment (UE), base station (eNB), and improved communication methods which enable a UE that is peak current limited to perform UL transmissions which are consistent with the UL timeline. Embodiments are also presented which enable a UE that is peak current limited to utilize a new form of distributed TTI (transmit time interval) bundling for improved uplink communication performance. Embodiments are further provided which allow for dynamic determination of bundle size in TTI bundling operations.

Some embodiments relate to a user equipment device (UE) comprising at least one antenna, at least one radio, and one or more processors coupled to the radio. The at least one radio is configured to perform cellular communication using at least one radio access technology (RAT). The one or more processors and the at least one radio are configured to perform voice and/or data communications, as well as the methods described herein.

In some embodiments, the UE is configured to transmit a scheduling request (SR) to a base station to request uplink resources, and in return receive an uplink grant from the base station. The UE may then transmit information to the base station using "distributed" TTI bundling, i.e., the UE may transmit a plurality of redundancy versions of first information to the base station, wherein the plurality of redundancy versions are transmitted in non-consecutive (or non-adjacent) sub-frames with a periodicity of X ms. After the plurality of redundancy versions of first information are transmitted to the base station, the base station may provide a single acknowledge/negative acknowledge (ACK/NACK) to the UE (i.e., after the UE transmits all of the non-adjacent redundancy versions, the UE receives a single ACK/NACK from the base station).

The periodicity value X ms may be a round trip time (RTT) of a hybrid automatic repeat request (HARQ). Alternatively, the value of the periodicity X ms may correspond to a peak current limitation of the UE, where a peak current limitation may refer to a limited battery and/or limited power amplifier capability.

The base station may be configured to dynamically determine a bundle size to be used by a UE, wherein the dynamically determined bundle size may be used in either normal or distributed TTI bundling. The base station may receive information from the UE indicating quality of an uplink channel used for communication between the UE and the base station. The base station may also receive information from the UE indicating power characteristics of the UE (e.g., peak current limitations of the UE). The base station may then dynamically determine a bundle size for TTI bundling based on the information indicating uplink channel quality and/or the information indicating power characteristics of the UE. Alternatively, the base station may dynamically determine the bundle size information based on a maxHARQ-Tx parameter, where the maxHARQ-Tx parameter may in turn be dynamically determined based on uplink channel quality and/or power characteristics of the UE. The base station may then transmit the bundle size to the UE, wherein the dynamically determined bundle size is used by the UE for uplink transmissions using TTI bundling (either normal or distributed). The base station may dynamically determine (or dynamically adjust) the bundle size for each communication session, or may dynamically determine the bundle size multiple times during a single communication session, as desired.

The UE may thus receive this dynamically generated bundle size information from the base station, wherein the bundle size information is dynamically determined by the base station based on uplink channel quality and/or power characteristics of the UE as described above. The UE may then transmit a bundle of redundancy versions of first information to the base station, wherein a number of the redundancy versions is based on the dynamically generated bundle size information. The bundle of redundancy versions may be transmitted in consecutive sub-frames (normal TTI bundling) or in non-consecutive sub-frames (distributed TTI bundling). In either instance, the UE may receive only a single acknowledge/negative acknowledge (ACK/NACK) from the base station after transmitting the plurality of different redundancy versions of first information to the base station.

The uplink grant received from the base station may be a type of persistent uplink grant, e.g., that specifies periodic uplink grants. A periodicity of the uplink grants may be based on a bundle size and the periodicity X ms, wherein the bundle size specifies a number of the plurality of redundancy versions of first information transmitted to the base station, and wherein X ms is a periodicity of transmission of the plurality of redundancy versions of first information. In some embodiments, the periodicity of the uplink grants is based on the bundle size multiplied by the periodicity X ms.

In some embodiments, the UE is configured to transmit a sounding reference symbol (SRS) in the same sub-frame as the scheduling request in an aligned manner. A duty cycle of the scheduling request and the sounding reference symbol may be less than or equal to a duty cycle of the distributed TTI bundling transmission. The SRS may be used by the base station to estimate uplink channel quality between the UE and the base station.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of the embodiments is considered in conjunction with the following drawings.

FIG. 5 illustrates traditional TTI bundling according to the prior art;

FIG. 7 illustrates an example of distributed TTI bundling, according to some embodiments;

Figure 1:
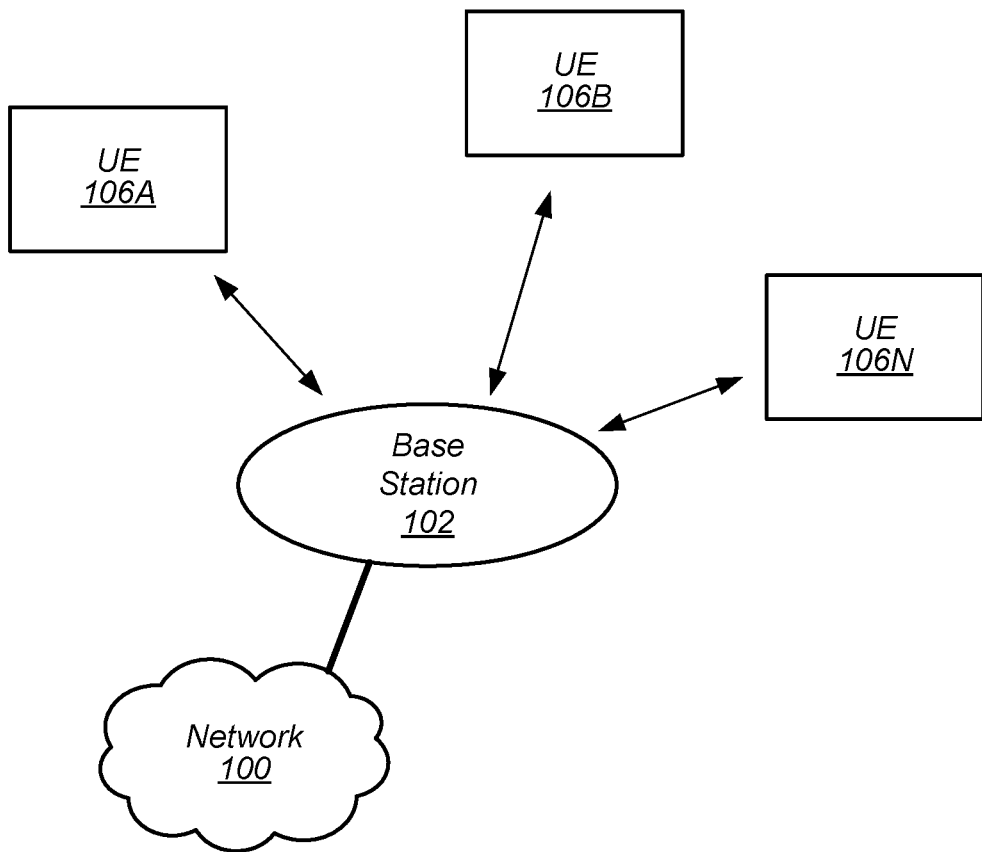
FIG. 1 illustrates an exemplary wireless communication system, according to some embodiments.

While the features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Terminology

The following is a glossary of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems devices which are mobile or portable and which perform wireless communications. Examples of UE devices include mobile telephones or smart phones (e.g., iPhone™, Android™-based phones), portable gaming devices (e.g., Nintendo DS™, PlayStation Portable™, Gameboy Advance™, iPhone™), laptops, wearable devices (e.g., smart watch, smart glasses), PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Base Station—The term "Base Station" (also called "eNB") has the full breadth of its ordinary meaning, and at least includes a wireless communication station installed at a fixed location and used to communicate as part of a wireless telephone system or radio system.

Processing Element—refers to various elements or combinations of elements. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors.

Channel—a medium used to convey information from a sender (transmitter) to a receiver. It should be noted that since characteristics of the term "channel" may differ according to different wireless protocols, the term "channel" as used herein may be considered as being used in a manner that is consistent with the standard of the type of device with reference to which the term is used. In some standards, channel widths may be variable (e.g., depending on device capability, band conditions, etc.). For example, LTE may support scalable channel bandwidths from 1.4 MHz to 20 MHz. In contrast, WLAN channels may be 22 MHz wide while Bluetooth channels may be 1 MHz wide. Other protocols and standards may include different definitions of channels. Furthermore, some standards may define and use multiple types of channels, e.g., different channels for uplink or downlink and/or different channels for different uses such as data, control information, etc.

Band—The term "band" has the full breadth of its ordinary meaning, and at least includes a section of spectrum (e.g., radio frequency spectrum) in which channels are used or set aside for the same purpose.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

FIG. 1—Wireless Communication System

FIG. 1 illustrates a wireless cellular communication system, according to some embodiments. It is noted that FIG. 1 represents one possibility among many, and that features of the present disclosure may be implemented in any of various systems, as desired.

As shown, the exemplary wireless communication system includes a base station 102A which communicates over a transmission medium with one or more wireless devices 106A, 106B, etc., through 106N. Wireless devices may be user devices, which may be referred to herein as "user equipment" (UE) or UE devices.

The base station 102 may be a base transceiver station (BTS) or cell site, and may include hardware that enables wireless communication with the UE devices 106A through 106N. The base station 102 may also be equipped to communicate with a network 100 (e.g., a core network of a cellular service provider, a telecommunication network such as a public switched telephone network (PSTN), and/or the Internet, among various possibilities). Thus, the base station 102 may facilitate communication between the UE devices 106 and/or between the UE devices 106 and the network 100.

The communication area (or coverage area) of the base station 102 may be referred to as a "cell." The base station 102 and the UEs 106 may be configured to communicate over the transmission medium using any of various radio access technologies (RATs) or wireless communication technologies, such as GSM, UMTS (WCDMA, TDS-CDMA), LTE, LTE-Advanced (LTE-A), HSPA, 3GPP2 CDMA2000 (e.g., 1×RTT, 1×EV-DO, HRPD, eHRPD), Wi-Fi, WiMAX etc.

Base station 102 and other similar base stations (not shown) operating according to one or more cellular communication technologies may thus be provided as a network of cells, which may provide continuous or nearly continuous overlapping service to UE devices 106A-N and similar devices over a wide geographic area via one or more cellular communication technologies.

Thus, while base station 102 may presently represent a "serving cell" for wireless devices 106A-N as illustrated in FIG. 1, each UE device 106 may also be capable of receiving signals from one or more other cells (e.g., cells provided by other base stations), which may be referred to as "neighboring cells". Such cells may also be capable of facilitating communication between user devices and/or between user devices and the network 100.

Note that at least in some instances a UE device 106 may be capable of communicating using multiple wireless communication technologies. For example, a UE device 106 might be configured to communicate using two or more of GSM, UMTS, CDMA2000, WiMAX, LTE, LTE-A, WLAN, Bluetooth, one or more global navigational satellite systems (GNSS, e.g., GPS or GLONASS), one and/or more mobile television broadcasting standards (e.g., ATSC-M/H or DVB-H), etc. Other combinations of wireless communication technologies (including more than two wireless communication technologies) are also possible. Likewise, in some instances a UE device 106 may be configured to communicate using only a single wireless communication technology.

Figure 2:
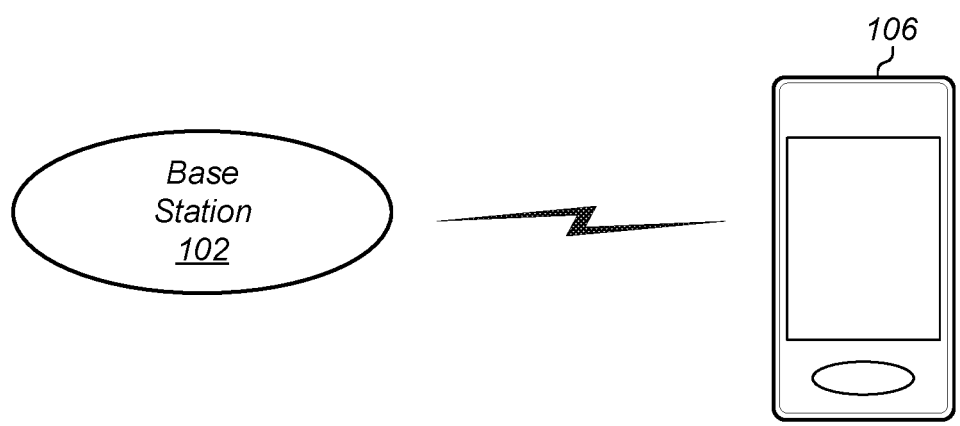
FIG. 2 illustrates a base station ("BS", or in the context of LTE, an "eNodeB" or "eNB") in communication with a wireless device, according to some embodiments.

FIG. 2 illustrates UE device 106 (e.g., one of the devices 106A through 106N) in communication with base station 102, according to some embodiments. The UE device 106 may have cellular communication capability, and as described above, may be a device such as a mobile phone, a hand-held device, a media player, a computer, a laptop or a tablet, or virtually any type of wireless device.

The UE device 106 may include a processor that is configured to execute program instructions stored in memory. The UE device 106 may perform any of the method embodiments described herein by executing such stored instructions. Alternatively, or in addition, the UE device 106 may include a programmable hardware element such as an FPGA (field-programmable gate array), or other circuitry, that is configured to perform any of the method embodiments described herein, or any portion of any of the method embodiments described herein.

In some embodiments, the UE device 106 may be configured to communicate using any of multiple radio access technologies and/or wireless communication protocols. For example, the UE device 106 may be configured to communicate using one or more of GSM, UMTS, CDMA2000, LTE, LTE-A, WLAN, Wi-Fi, WiMAX or GNSS. Other combinations of wireless communication technologies are also possible.

The UE device 106 may include one or more antennas for communicating using one or more wireless communication protocols or technologies. In some embodiments, the UE device 106 might be configured to communicate using a single shared radio. The shared radio may couple to a single antenna, or may couple to multiple antennas (e.g., for MIMO) for performing wireless communications. Alternatively, the UE device 106 may include two or more radios. For example, the UE 106 might include a shared radio for communicating using either of LTE or 1×RTT (or LTE or GSM), and separate radios for communicating using each of Wi-Fi and Bluetooth. Other configurations are also possible.

Figure 3:
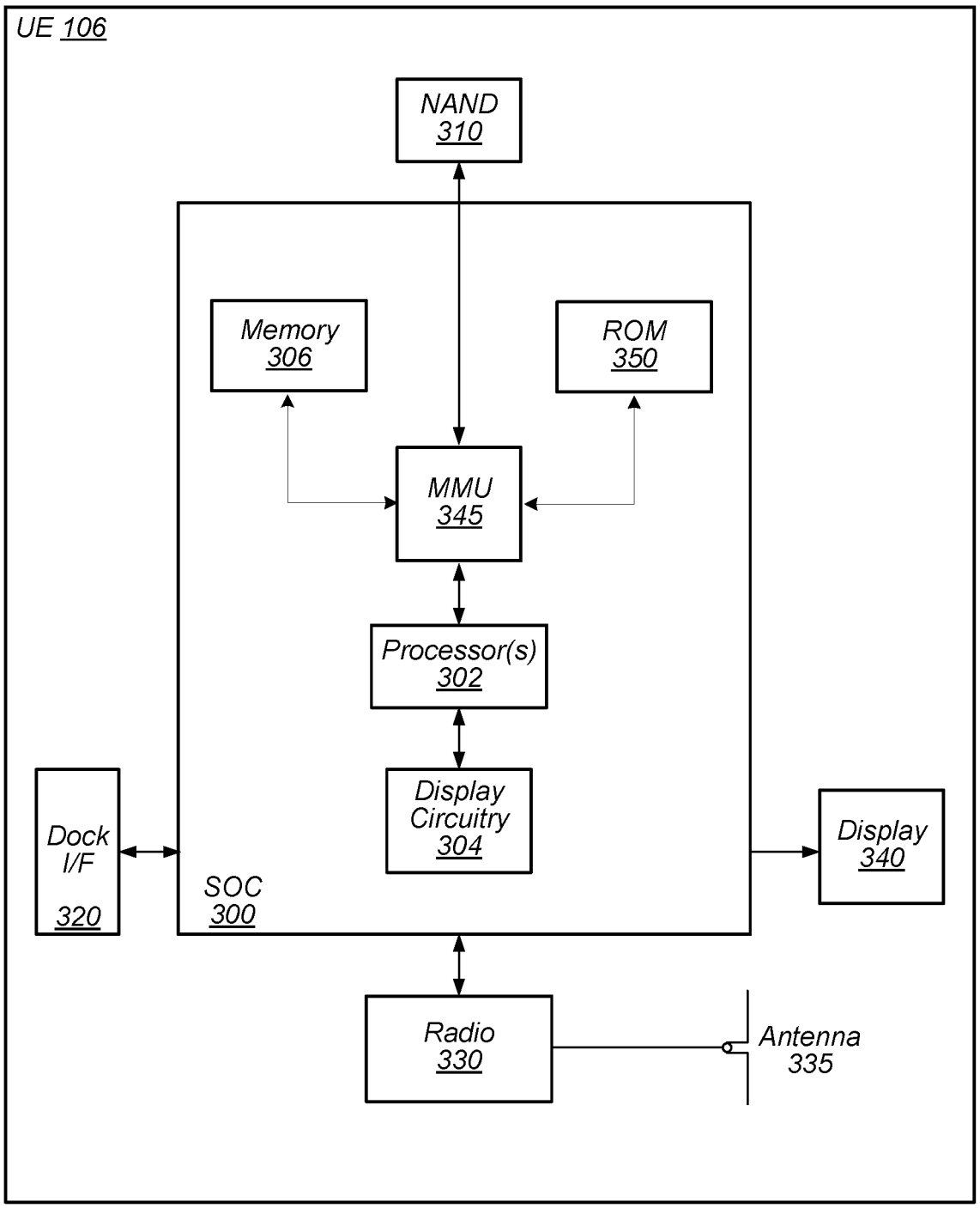
FIG. 3 illustrates a block diagram for one possible implementation of a wireless communication system, according to some embodiments.

FIG. 3—Example Block Diagram of a UE

FIG. 3 illustrates one possible block diagram of a UE 106, according to some embodiments. As shown, the UE 106 may include a system on chip (SOC) 300, which may include portions for various purposes. For example, as shown, the SOC 300 may include processor(s) 302 which may execute program instructions for the UE 106, and display circuitry 304 which may perform graphics processing and provide display signals to the display 340. The processor(s) 302 may also be coupled to memory management unit (MMU) 345, which may be configured to receive addresses from the processor(s) 302 and translate those addresses to locations in memory (e.g., memory 306, read only memory (ROM) 350, NAND flash memory 310). The MMU 345 may be configured to perform memory protection and page table translation or set up. In some embodiments, the MMU 345 may be included as a portion of the processor(s) 302.

The UE 106 may also include other circuits or devices, such as the display circuitry 304, radio 330, connector I/F 320, and/or display 340.

In some embodiments, ROM 350 may include a bootloader, which may be executed by the processor(s) 302 during boot up or initialization. As also shown, the SOC 300 may be coupled to various other circuits of the UE 106. For example, the UE 106 may include various types of memory (e.g., including NAND flash 310), a connector interface 320 (e.g., for coupling to a computer system), the display 340, and wireless communication circuitry (e.g., for communication using LTE, CDMA2000, Bluetooth, WiFi, GPS, etc.).

The UE device 106 may include at least one antenna, and in some embodiments multiple antennas, for performing wireless communication with base stations and/or other devices. For example, the UE device 106 may use antenna 335 to perform the wireless communication. As noted above, the UE may in some embodiments be configured to communicate wirelessly using a plurality of wireless communication standards.

As described herein, the UE 106 may include hardware and software components for implementing a method for responding to enhanced paging according to embodiments of this disclosure.

The processor 302 of the UE device 106 may be configured to implement part or all of the methods described herein, e.g., by executing program instructions stored on a memory medium (e.g., a non-transitory computer-readable memory medium). In other embodiments, processor 302 may be configured as a programmable hardware element, such as an FPGA (Field Programmable Gate Array), or as an ASIC (Application Specific Integrated Circuit).

Figure 4:
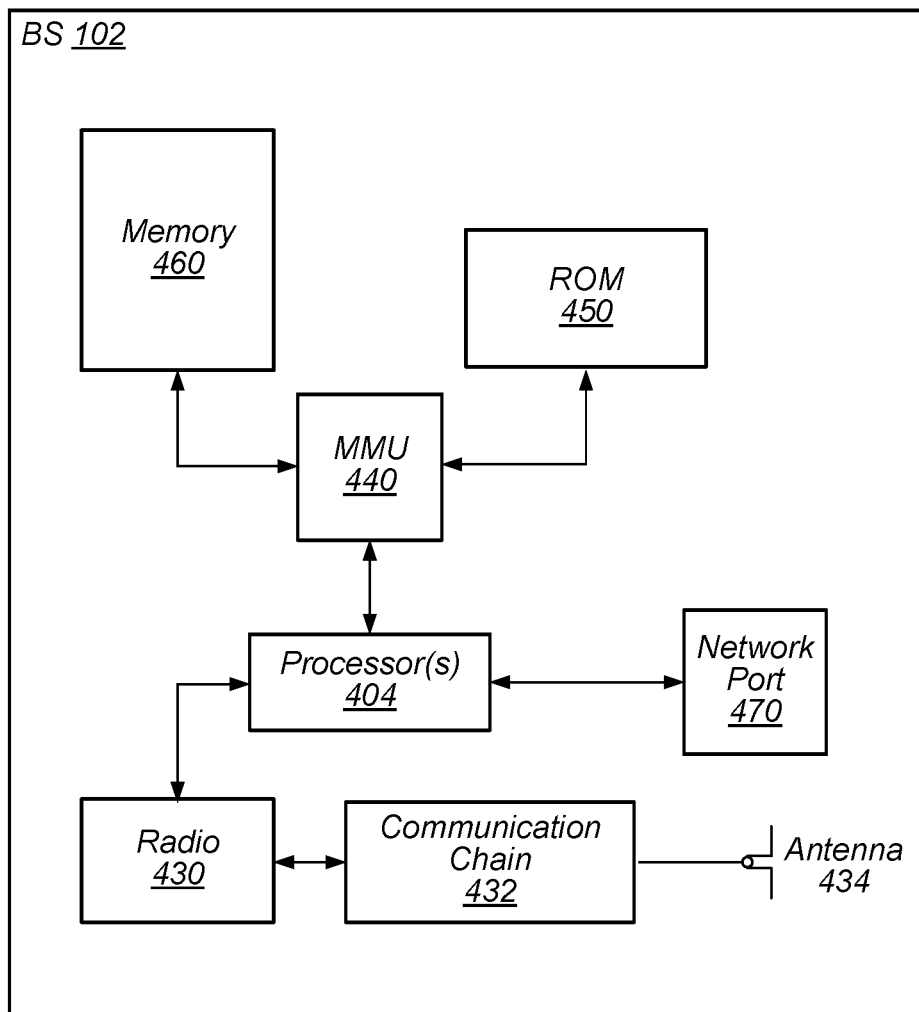
FIG. 4 illustrates a block diagram for an exemplary base station, according to some embodiments.

FIG. 4—Base Station

FIG. 4 illustrates a base station 102, according to some embodiments. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above.

The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

The base station 102 may include a radio 430, a communication chain 432 and at least one antenna 434. The base station may be configured to operate as a wireless transceiver and may be further configured to communicate with UE devices 106 via radio 430, communication chain 432 and the at least one antenna 434. Communication chain 432 may be a receive chain, a transmit chain or both. The radio 430 may be configured to communicate via various RATs, including, but not limited to, GSM, UMTS, LTE, WCDMA, CDMA2000, WiMAX, etc.

The processor(s) 404 of the base station 102 may be configured to implement part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof.

Channels in LTE

LTE uses various channels so that data can be transported across the LTE radio interface. These channels are used to segregate the different types of data and allow them to be transported across the radio access network in an orderly fashion. The different channels effectively provide interfaces to the higher layers within the LTE protocol structure, and enable an orderly and defined segregation of the data.

There are three categories or types of LTE data channels as follows.

Physical channels: These are transmission channels that carry user data and control messages.

Transport channels: The physical layer transport channels offer information transfer to Medium Access Control (MAC) and higher layers.

Logical channels: Provide services for the Medium Access Control (MAC) layer within the LTE protocol structure.

LTE defines a number of physical downlink channels to carry information from the base station to the UE. The LTE downlink comprises a physical downlink shared channel (PDSCH) and a physical downlink control channel (PDCCH). The PDSCH is the downlink channel that carries all user data and all signaling messages. The PDSCH is the main data bearing channel which is allocated to users on a dynamic and opportunistic basis. The PDCCH carries the layer one control for the shared channel. Thus, the PDSCH is the key channel for communicating information to the UE, and the PDCCH communicates metadata for the information, e.g., "who" the data is for, "what" data is sent, and "how" the data is sent over the air in the PDSCH.

LTE also defines a number of physical uplink channels to carry information from the UE to the base station. The LTE uplink comprises a physical uplink shared channel (PUSCH) and a physical uplink control channel (PUCCH). The PUSCH is the uplink counterpart to the PDSCH. The PUCCH provides the various control signaling requirements for uplink communications.

As described above, in LTE the base station (eNB) assigns UL resources using the PDCCH, wherein this assignment of resources is called a UL grant. The UL grant may be a type of persistent UL grant such as a semi-persistent scheduling (SPS) UL grant. The persistent or semi-persistent UL grant may be configured by radio resource control (RRC) layer signaling and the UE may be configured with SPS by the eNB, and then the eNB may activate the UE to use SPS. Persistent or semi-persistent UL grants, such as SPS, allows for a persistent, periodic UL grant. Thus, the UE may transmit new information periodically without receiving a new UL grant for each transmission. Alternatively, the UL grant may be for a specified amount of information, and the eNB may send additional UL grants based on scheduling requests from the UE.

TTI Bundling

In normal operations, a transport block is converted to multiple redundancy versions after coding and the first redundancy version is sent in a sub-frame. If this first redundancy version is not properly received, the receiver will return a negative acknowledge (NACK), which results in a hybrid automatic repeat request (HARQ), i.e., a retransmission of a new, typically different, redundancy version. One common type of automatic repeat request is HARQ (hybrid automatic repeat request). The HARQ ACK/NACK is sent 4 sub-frame durations or more after the first transmission. Thus in normal operations subsequent transmissions of the transport block, i.e., subsequent transmissions of another redundancy version, are dependent on non-receipt (NACK) of the first redundancy version that was transmitted.

TTI bundling is a technique used to send a transport block multiple times in consecutive sub-frames without waiting for HARQ ACK/NACK messages. In TTI bundling, a plurality of the redundancy versions can all be sent in consecutive (adjacent) sub-frames without waiting for the HARQ ACK/NACK feedback. In addition, a combined ACK/NACK can be sent after processing all the transmissions of a transport block, i.e., after all of the consecutive redundancy versions have been sent. One motivation for TTI bundling is the low transmission power of some handsets and the long RTT (round trip time) of the HARQ transmissions. TTI bundling is designed to improve the UL coverage of applications like VOIP over LTE wherein low power handsets are likely to be involved.

Thus, TTI bundling is used to achieve successful transmissions from power limited UEs. The TTI bundling process described herein is typically triggered by the UE informing the eNB about its current power limitations via radio resource control (RRC) layer signaling. In contrast, according to the prior art, TTI bundling is triggered by a base station scheduler when the base station scheduler detects that the UE is both link budget limited and using VoLTE (voice over LTE). Note that the TTI bundling process described herein is not limited to VoLTE application and may be applied to other, non-real time applications.

For example, the TTI bundling process described herein may be employed at the edge of a cell when the UE is required to transmit at high power, but where the UE has limited power capability. After the eNB is notified about the UE's limited power capability, the UE may transmit the various redundancy versions of the same transport block in consecutive sub-frames or TTIs to the base station, giving rise to the name TTI bundling. These multiple consecutive transmissions may provide for reduced overhead. A single HARQ ACK/NACK for the combined transmissions is generated by the eNB after processing the TTI bundle. The transmission of a TTI bundle, instead of merely a single redundancy version transmission, may reduce the error rate of the transport block. This approach can also reduce the delay in the HARQ process compared to transmissions of the redundancy versions separated in time using the normal (non-TTI bundling) approach.

FIG. 5 illustrates an example of TTI bundling, i.e., contiguous retransmissions of different redundancy versions of an UL packet. As shown, the UE transmits four different redundancy versions of the data consecutively, these being redundancy versions (RVs) 0, 3, 2 and 1. The eNB will send an ACK/NACK feedback after the fourth retransmission, as shown.

However, as noted in the Background section, a device which is peak current limited is not able to transmit continuously in the UL, e.g., it can transmit only on a low duty cycle. For example, a device which is peak current limited may only be able to transmit during one out of ten sub-frames, i.e., with a duty cycle of 10%. Such devices are thus unable to take advantage of TTI bundling as defined in the current LTE specification.

Therefore, improved methods are desired which would allow such a peak current limited UE to take advantage of TTI bundling. Some embodiments of this disclosure contemplate a distributed TTI bundling technique. The distributed TTI bundling technique described herein involves "bundling" of different redundancy versions in non-consecutive (or non-adjacent) sub-frames, followed by a single ACK/NACK generated at the end. Some embodiments of this disclosure contemplate a TTI bundling technique with dynamic determination of the TTI bundle size based on current conditions. The dynamic TTI bundling technique described herein involves dynamically determining a number of different redundancy versions based on recent sounding reference symbols (SRS) received from the UE, which indicates the current UL channel quality and/or current power conditions of the UE. Note that the dynamic determination of TTI bundle size may be used with conventional TTI bundling (with redundancy versions transmitted bundled together in consecutive sub-frames) or with the distributed TTI bundling technique described herein (with redundancy versions transmitted in non-consecutive or non-adjacent sub-frames).

Figure 6:
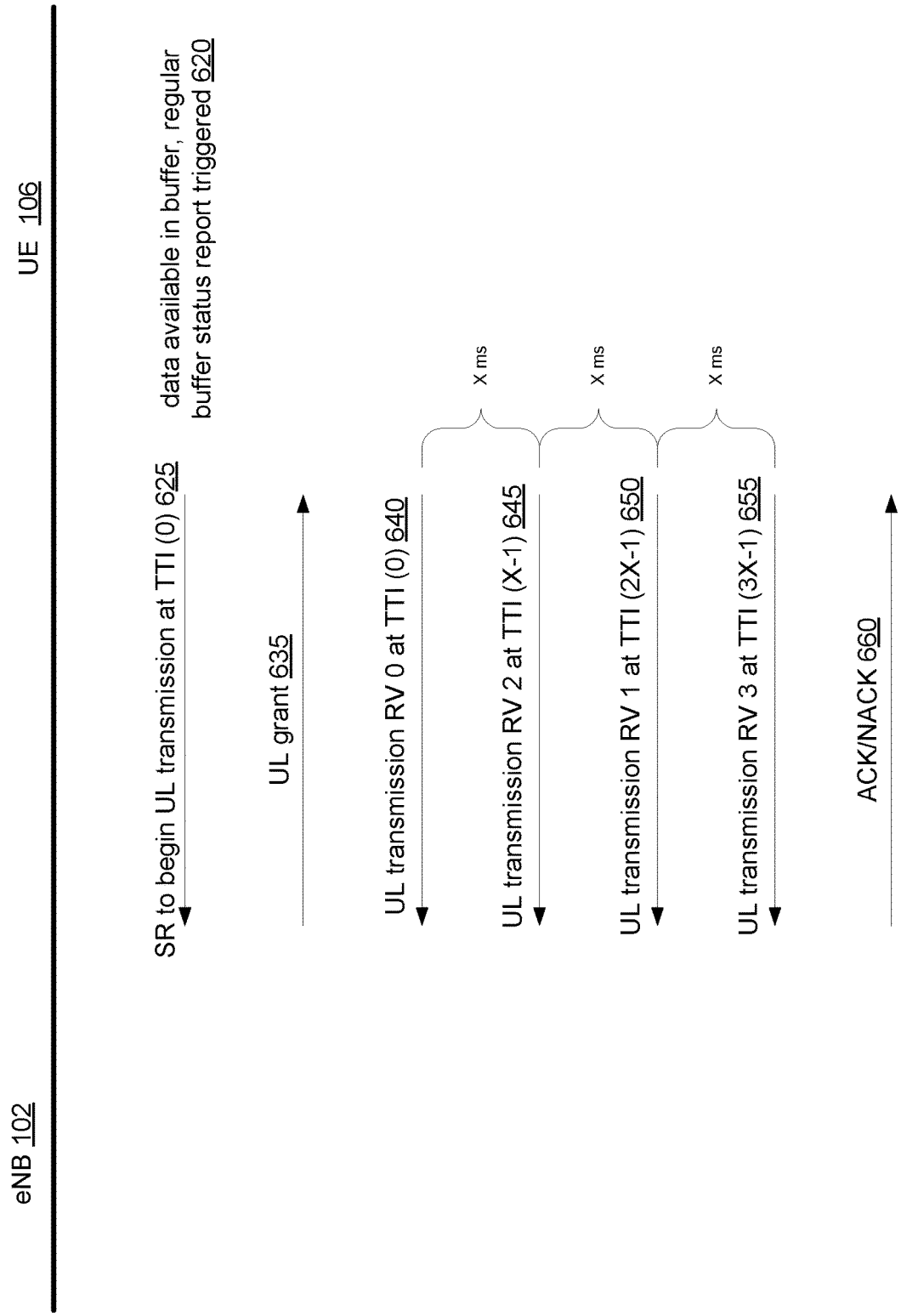
FIG. 6 illustrates a method for performing distributed TTI bundling, according to some embodiments.

FIG. 6—Distributed TTI Bundling and Periodic Grant

In some embodiments, a method for performing communications may include the signaling operations between a base station, such as eNB 102, and a user equipment, such as UE 106, shown in FIG. 6. (The method may also include any subset of the features, elements and embodiments described above.) The method may be performed to provide improved uplink communication performance in a cellular communication system.

As shown, at 620 the UE may determine that it has data (e.g., first information) available in its buffer and a regular BSR (buffer status report) may be triggered. Thus, if the UE has data to transmit to the base station, the BSR is triggered. Here it is presumed that the UE is current peak limited and hence is not able to transmit continuously in the UL. For example, the UE may be only able to perform UL transmissions with a low duty cycle. One example of a low duty cycle is 30% or less. In some embodiments, the UE is capable of transmission during only one out of ten sub-frames, i.e., it can transmit during one sub-frame and remains silent for the next 9 sub-frames, resulting in a duty cycle of 10%.

At 625, if the UE does not have UL resources it will send an SR (scheduling request) to the base station (eNB). The SR may request to begin a UL transmission at a prescribed time, such as TTI (0). Prior to sending the SR to the base station, e.g., upon joining with the eNB, the UE may signal the eNB that it is peak current limited, and hence may have a low transmission duty cycle. The eNB will then ensure that the SR and SRS transmitted by the UE are aligned. In other words, upon learning that the UE is peak current limited, the eNB may ensure that the UE operates such that the periodicity of the SR and SRS are aligned. Alternatively, the UE may explicitly signal the eNB that it desires to send one or more sounding reference symbols (SRS) in the same sub-frame as the scheduling request (SR) sent in 625. Sounding reference symbols are transmitted by the UE to the base station in the UL to provide the base station an indication of UL channel quality, and also to convey timing information. Thus, at 625, the UE may transmit the SR and the SRS simultaneously in the same sub-frame. In some embodiments, the duty cycle (periodicity) of SR and SRS is preferably smaller or equal to the duty cycle of the UL transmission as dictated by the peak current limitation.

In response to receiving the SR at 625, the eNB may configure the bundle size of the distributed transmit time interval based at least in part on the SRS information, as described below in FIG. 7. In other words, the bundle size information may be dynamically determined by the eNB based on current conditions such as the quality of the UL channel between the UE and the base station and/or the power characteristics of the UE. Note that the power characteristics of the UE may be conveyed by the UE to the base station in an RRC message. A length of the distributed transmit time interval (TTI) bundling may effectively correspond to the maximum number of HARQ retransmissions, as reflected in the maxHARQ-Tx parameter.

The bundle size specifies the number of retransmissions of the redundancy versions. Thus, for example, if the eNB determines that each redundancy version (RV) should be sent once based on the SRS information, then the bundle size would be four. In another example, if the eNB determines that only three redundancy versions are desired to receive the transmission, then the bundle size would be three. As yet another example, if the eNB determines that eight redundancy versions are desired, then the four redundancy versions may be each sent twice for a total of eight.

Additionally, in response to receiving the SR at 625, the eNB may send an UL grant at 635. The UL grant may be a dynamic and/or persistent UL grant. In some embodiments, the UL grant may be a semi-persistent UL grant such as a SPS (semi-persistent scheduling) UL grant. In other words, the uplink grant received from the eNB may include information specifying periodic uplink grants. Thus, in some embodiments, the periodicity of the UL grants may be based on the duty cycle of the UE transmissions and the bundle size.

In response to receiving the UL grant 635, the UE may send data (e.g., first information) via an UL transmission using RV 0 at time zero corresponding to TTI (0). In other words, the UE may send the data using a first redundancy version. Then, the UE may wait a period of X milliseconds (X ms) before sending another UL transmission using RV 2 at 645, i.e., the UE may send the data using a different redundancy version. The UE may then proceed to periodically send the remaining transmissions of the bundle every X ms. Thus, at 650, UL transmission of RV 1 may be sent X ms after UL transmission using RV 2. Similarly, at 655, UL transmission of RV 3 may be sent X ms after UL transmission using RV 1.

At 660, the eNB may send an acknowledge (ACK) or negative acknowledge (NACK) message. Thus, the eNB may send only a single ACK/NACK message after all of the RV transmissions of the bundle (the distributed bundle) have been sent by the UE (and received by the eNB). This may result in increased transmission efficiency for UEs that are peak current limited. In some embodiments, the UE may not perform retransmission of the UL transmission in response to receiving a NACK. In other words, if none of the RV transmissions of the distributed bundle were received properly by the eNB, and the eNB sends a negative acknowledge, the UE may not retransmit the first information.

Additionally, if the UL grant at 635 was a persistent or semi-persistent UL grant, such as a SPS UL grant, the UE may begin transmission of new data (e.g., second information) via a new distributed TTI bundled UL transmission X ms after the last UL transmission using RV 3 has been sent at 655. Alternatively, if the UL grant at 635 was dynamic, but not a persistent or semi-persistent UL grant, the eNB may send a new UL grant at least X−4 ms after the last retransmission, i.e., within X−4 ms of the UL transmission of RV 3 at 655. Upon receiving the new UL grant, the UE may begin transmission of the new data via the new distributed TTI bundled UL transmission at least X ms after the last UL transmission of RV 3 has been sent at 655.

At some point in time, when the UE determines it is no longer peak current limited, the UE may so inform the eNB, such as using a new RRC message or a reserved MAC control element (CE). The UE may then discontinue use of distributed TTI bundling as described here, and may return to more normal communications.

FIG. 7—Distributed TTI-Bundling

As described above with respect to FIG. 6, in some embodiments the method uses a form of "distributed" TTI bundling (TTI-B). The actual form of one example of distributed TTI bundling, according to some embodiments, is shown in FIG. 7. For UEs that are peak current and/or power limited and which cannot transmit on consecutive sub-frames, and which hence cannot take advantage of traditional prior art TTI bundling as shown above in FIG. 5, the distributed TTI bundling method described herein (e.g., described in FIG. 6 and illustrated in FIG. 7) allows such UEs to achieve similar benefits to traditional TTI bundling.

In particular, as described above in reference to FIG. 6, the UE may send multiple non-consecutive (and hence distributed) UL redundancy version (RV) transmissions of data (e.g., first information) and does not receive an ACK/NACK feedback from the eNB to retransmit until all of the non-consecutive RVs have been sent. In other words, instead of sending multiple UL transmissions of (typically different) redundancy versions in consecutive sub-frames (normal TTI bundling as shown if FIG. 5), the UE may send multiple UL transmissions of (typically different) redundancy versions over multiple non-consecutive sub-frames. As shown in FIG. 7, a single ACK/NACK is generated by the eNB only after all of the redundancy versions have been transmitted. This enables avoidance of violation of the HARQ timeline in the UL.

Thus, in some embodiments, the distributed TTI-B may be defined as follows:

The UE may send the data (e.g., HARQ Process #0) via UL transmissions with different redundancy versions (RVs) every X ms, where X is the periodicity of the retransmission. Thus, as shown in FIG. 7, HARQ Process #0 encoded using redundancy version (RV) 0 may be transmitted by the UE at TTI# (e.g., time) 0. The UE may then wait X sub-frames (e.g., TTI periods), where each sub-frame corresponds to a unit of time such as one millisecond, before sending HARQ Process #0 encoded using RV 2, thus sending the second transmission of the TTI-B in a non-consecutive sub-frame. Further, the UE may wait another X sub-frames prior to sending HARQ Process #0 encoded using RV 3. Similarly, the UE may wait another X sub-frames prior to sending HARQ Process #0 encoded using RV 1. Thus, the TTI-B may be distributed over 3X sub-frames as shown. Additionally, after sending the HARQ Process #0 encoded using RV 3, the UE may receive an ACK/NACK from the eNB. As shown, in some embodiments the UE may not retransmit HARQ Process #0 after receiving a NACK. Furthermore, if the UE received a dynamic or persistent UL grant as described above, the UE may transmit data, e.g., HARQ Process #1 X sub-frames after transmitting the final RV version of HARQ Process #0.

In some embodiments X may be the round trip time (RTT) of the HARQ. In current LTE specifications, the HARQ RTT is 8 ms and each TTI is 1 ms. Thus, the RV versions may be sent every 8 ms (i.e., every 8 TTIs or sub-frames). In some embodiments, the X ms used corresponds to the duty cycle imposed by the peak current limitation. For example, in some embodiments X=10 ms, and the RV versions of the distributed TTI-B may be sent every 10 ms (i.e., every 10 TTIs or sub-frames). It is noted that other values of X are also contemplated. In one example implementation, the periodicity X may range between 4-12 ms, among other possible values. Additionally, the periodicity X may correspond to a peak current limitation of the UE. If X is larger than 8 ms, then the RTT could be changed and becomes equal to X. For example, if X=10 ms, then RTT may also be 10, and the number of HARQ processes is 10.

In some embodiments, the bundle size may correspond to the parameter maxHARQ-Tx as defined by an RRC (radio resource control) message provided by the UE to the eNB. The maxHARQ-Tx parameter may be determined at least in part based on the current uplink channel quality, as indicated by an SRS received by the eNB, as well as the current power limitations of the UE. Thus, the eNB may dynamically adjust the bundle size based on the channel condition between the eNB and the UE and the current power state of the UE. This dynamic bundle size operation is described in greater detail with respect to FIG. 8. Alternatively, the bundle size may be fixed and may be further prescribed by the RAT. For example, in current LTE specifications, the bundle size is fixed at 4.

The eNB may send an ACK/NACK feedback only after the last UL HARQ transmission. However, since the max-HARQ-Tx is reached with the last transmission, a NACK that is received may be ignored by the UE since, similar to normal HARQ, the HARQ buffer is flushed. Thus, the UE may proceed to send a second distributed TTI-B (e.g., starting with HARQProcess #1 transmitted at TTI #4X−1) as shown in FIG. 7.

Figure 8:
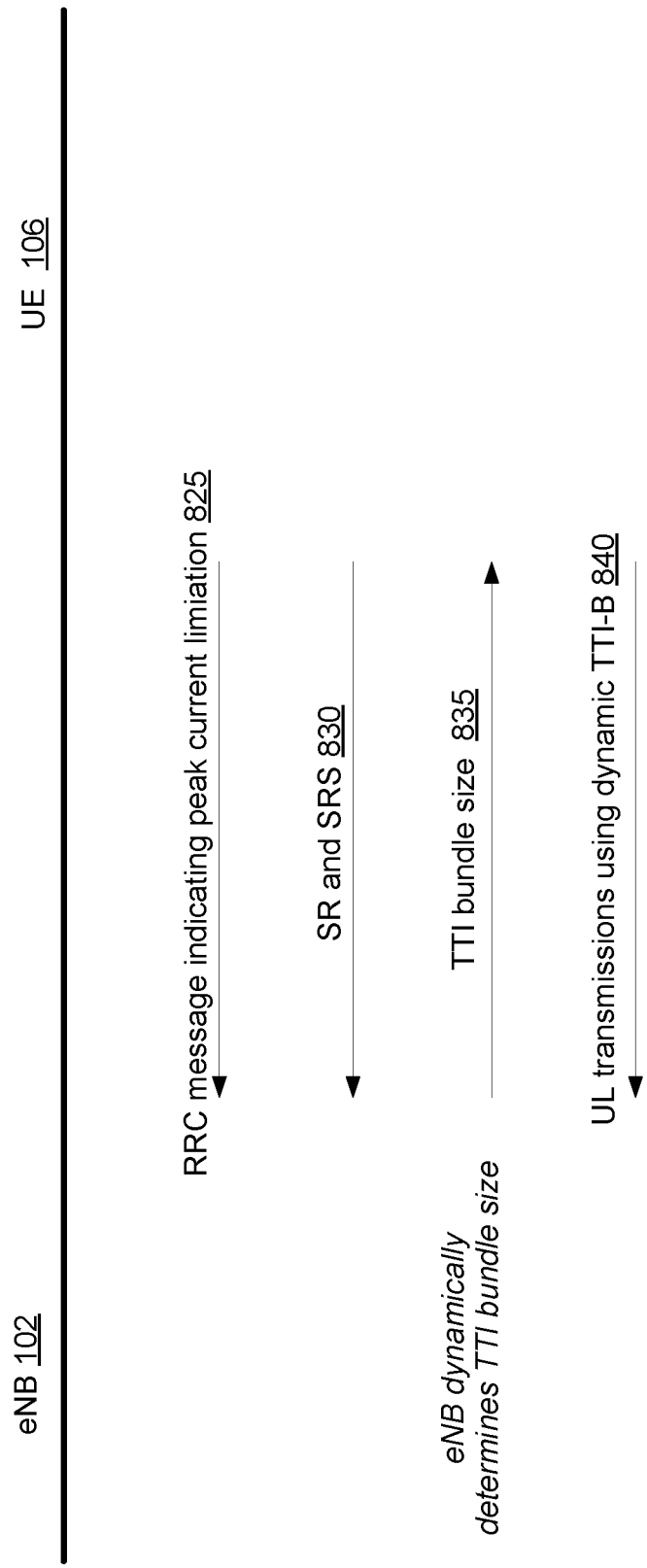
FIG. 8 illustrates a method for dynamically determining and using a TTI bundle size, according to some embodiments.

FIG. 8—Dynamic TTI Bundling

As introduced above, in some embodiments the method uses a form of "dynamic" TTI bundling (TTI-B). The dynamic TTI bundling method described herein allows for more efficient communications between the UE and the eNB, whereby the bundle size used in TTI bundling (either normal or distributed TTI bundling) can be effectively "tuned" to the current environmental conditions. For example the TTI bundle size can be tuned to one or more of the current uplink channel quality, the current power characteristics of the UE, and/or other factors.

Thus, in some embodiments, a method for performing communications may include the signaling operations between a base station, such as eNB 102, and a user equipment, such as UE 106, shown in FIG. 8. (The method may also include any subset of the features, elements and embodiments described above.) Further, part or all of the method of FIG. 8 may be performed with other methods described herein. The method may be performed to provide improved uplink communication performance in a cellular communication system.

At 825, the UE may signal to the eNB that its peak current and/or power is limited via a radio resource control (RRC)

message. In response, the eNB may configure the scheduling request (SR) and sounding reference symbols (SRS) to be aligned and transmitted from the UE in the same sub-frame. In addition, the eNB may configure the duty cycle of the SR and SRS to be less than or equal to the duty cycle of the UE.

At 830, the SR and SRS may be transmitted from the UE to the eNB. In response, the eNB may determine a TTI bundle size based at least in part on the SRS, which is an indication of channel quality between eNB and UE. Thus, for example, eNB may determine, based on the received SRS, that a TTI bundle size of 3 may be necessary to ensure receipt of data from the UE. As another example, the eNB may determine, based on the received SRS, that a TTI bundle size of 8 may be necessary to ensure receipt of data from the UE. The eNB may also (or instead) determine the bundle size based at least in part on the current power characteristics of the UE, obtained from the received RRC message.

At 835, the eNB transmits the TTI bundle size to the UE. The eNB may transmit the TTI bundle size to the UE in the form of the maxHARQ-Tx parameter, although other forms of communication may be used.

In response, the UE begins UL transmissions using TTI bundling (TTI-B). In other words, the UE transmits a bundle of redundancy versions (RVs) of data (e.g., first information) to the eNB. Note that, depending on the peak current and/or power constraints of the UE, the UE may employ distributed TTI-B as described above and/or normal TTI-B when performing UL transmissions. Thus, the UE may transmit the bundle of RVs in non-consecutive sub-frames. Alternatively, the dynamically determined TTI bundle size may be used with traditional TTI bundling as described above. Thus, the UE may transmit the bundle of RVs in either consecutive or non-consecutive sub-frames.

Further Embodiments—Periodic Grant or Constrained Scheduling

As mentioned above, the UL transmission may require multiple (e.g., dynamic or persistent/semi-persistent) UL grants. For example, if the UL transmission requires sending 1000 bytes of data, the UE may not have enough power and/or the channel conditions may not be favorable for sending all the data in one transmission. Thus, the transmission may be broken up into smaller segments, such as 200 bytes or 100 bytes, thus requiring periodic UL grants, such as the dynamic and persistent/semi-persistent UL grants described above. Thus, in some embodiments, the grant periodicity may be equal to the bundle size, either specified or, in the case of dynamic bundle sizing, determined by the eNB, and the spacing between UL HARQ transmissions. Thus, for example, if the number of bundles is four and the RTT is 8 ms, then the grant periodicity is 32 ms. In other words, the periodicity of the grant may be a function of the bundle size and the duty cycle of the UE.

Note that in some embodiments, the periodic UL grant may be released similarly to an SPS grant through a PDCCH SPS release command. Additionally, it may also be overwritten by a cell radio network temporary identifier (C-RNTI) PDCCH command. Further, similar to an LTE implicit release for SPS in UL, if the UE sends one medium access control (MAC) protocol data unit (PDU) with zero MAC service data unit (SDU), it may imply that the UL transmission of data is finished and the periodic grant may be deactivated.

Alternatively, or in addition to, for bursty (i.e., high levels of) traffic, if the eNB detects that the UE has a peak current limitation (e.g., through an RRC message exchange as explained above), the eNB may have a constrained schedule, i.e., it will provide UL grants that are separated by at least X sub-frames (as defined above) corresponding to the duty cycle needed to solve the peak current limitation. Note that the UE may inform the eNB of the duty cycle needed.

HARQ Transmission

Figure 9:
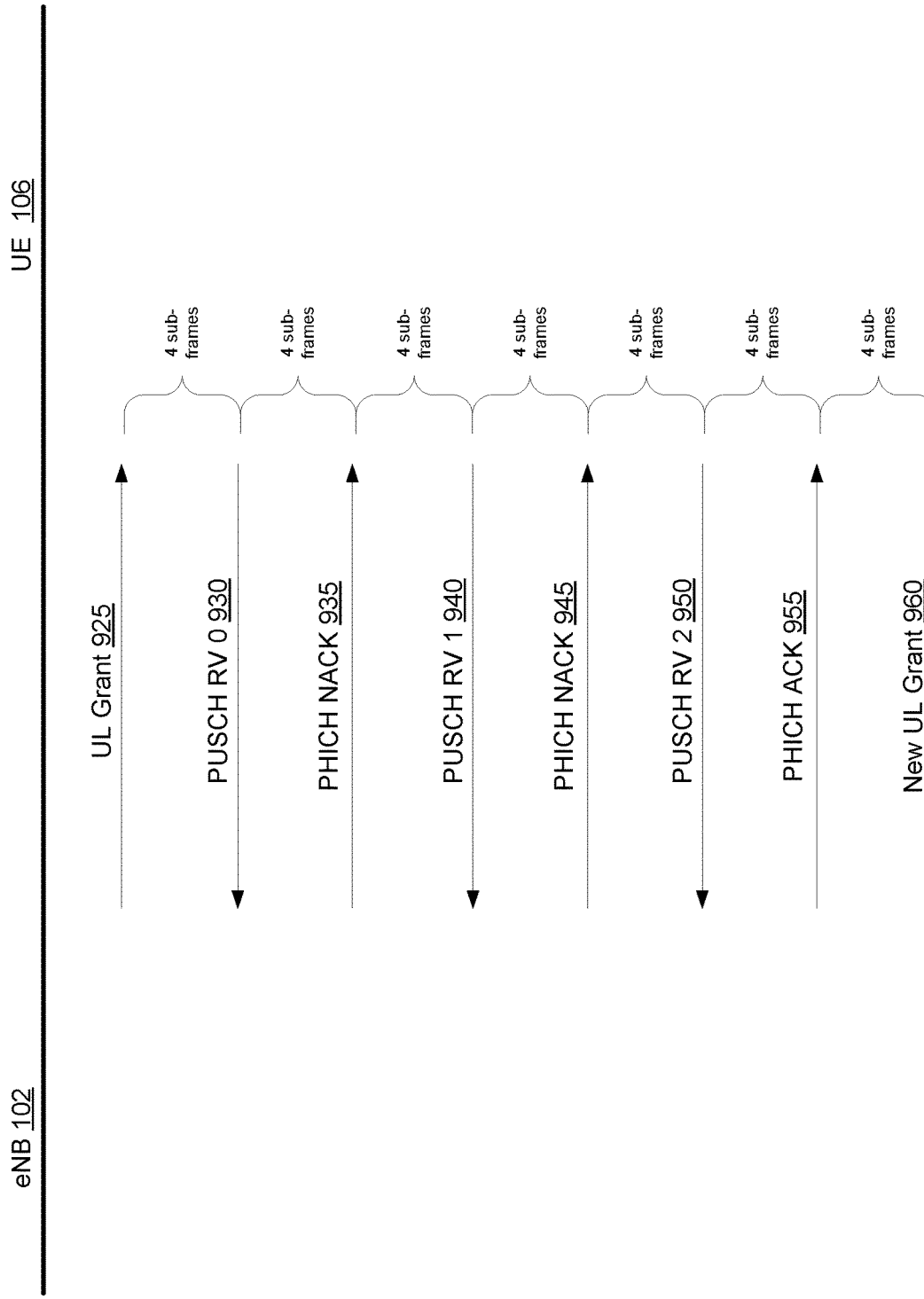
FIG. 9 illustrates traditional HARQ signaling according to the prior art.

In a normal (prior art) HARQ transmission scheme, as illustrated in FIG. 9, the UE may receive a uplink (UL) grant, such as the UL grant illustrated at 925. Then, at 930, the UE may transmit data using a first redundancy version (RV 0) to the eNB (base station) on the physical uplink shared channel (PUSCH). Note that the transmission at 930 will occur 4 sub-frames (e.g., 4 ms) after receipt of the UL grant at 925. Subsequent signaling between the UE and eNB will occur every 4 sub-frames as illustrated in FIG. 9 as it is the case for the synchronous UL HARQ in LTE.

Thus, at 935, the eNB may send a NACK (negative acknowledge) on the physical HARQ indicator channel (PHICH) and, in response, the UE may transmit the data using another redundancy version, RV 1, on the PUSCH at 940.

At 945, the eNB may send another NACK and, in response, the UE may send the data using a third redundancy version, RV 2, at 950. This transmission, as shown in FIG. 9, may result in an ACK (acknowledge) from the eNB at 955. Accordingly, at 960, the eNB may transmit a new UL grant to the UE indicating the UE may send new data.

Note that in order to maintain, i.e., not violate, the UL timeline for transmission, the UE transmits or receives signals every 4 sub-frames (e.g., every 4 ms according to the current LTE specification). In other words, the round trip time (RTT) of the HARQ transmission is 8 sub-frames (e.g., 8 ms according to the current LTE specification). However, as noted in the Background section, a device which is peak current limited is not able to transmit continuously in the UL, e.g., it can transmit only on a low duty cycle. For example, a device which is peak current limited may only be able to transmit during one out of ten sub-frames, i.e., with a duty cycle of 10%. Such devices are thus unable to maintain the UL timeline of the current LTE specification.

Therefore, improved methods are desired which would allow such a peak current limited UE to maintain, or at least not violate, the UL timeline while minimally impacting current standards. Thus, some embodiments of this disclosure contemplate a technique in which HARQ transmissions may be alternated, or interleaved with, discontinuous transmission (DTX). This technique may allow a peak current limited UE to not violate the UL timeline as defined by current standards.

Figure 10:
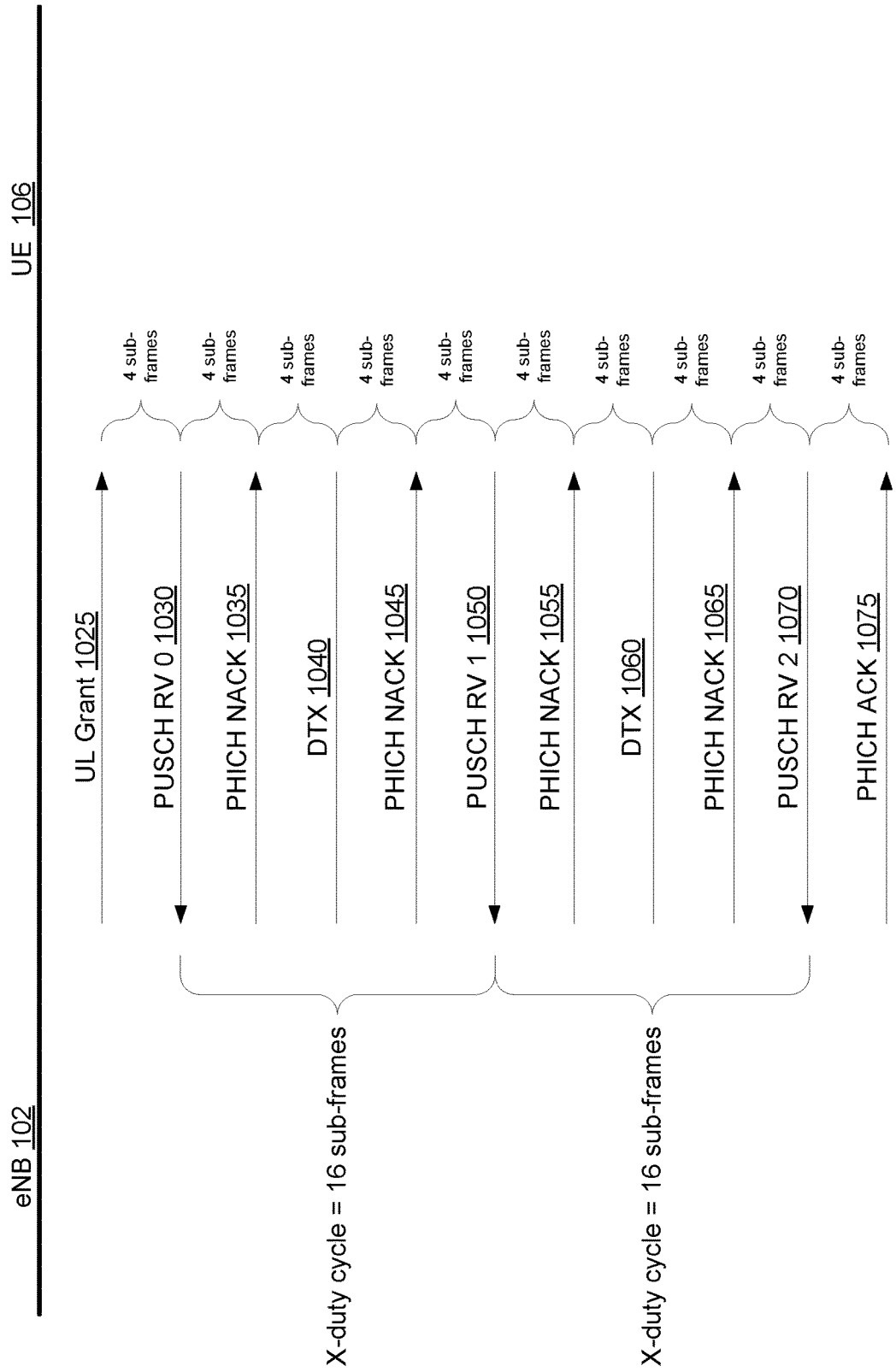
FIG. 10 illustrates a method for performing HARQ transmissions using DTX, according to some embodiments.

FIG. 10—HARQ Retransmission Modification

In some embodiments, a method for performing communications may include the signaling operations between a base station, such as eNB 102, and a user equipment, such as UE 106, shown in FIG. 10. (The method may also include any subset of the features, elements and embodiments described above.) Also, part or all of the method of FIG. 10 may be used any of the methods described herein. The method may be performed to provide improved uplink communication performance in a cellular communication system.

At 1025, the UE may receive an UL grant from the eNB. The UL grant may be a dynamic or persistent UL grant as described above. In response, the UE may transmit data (e.g., first information) using a first redundancy version (RV 0) to the eNB on the PUSCH at 1030. In response, and in accordance with the HARQ timeline, the eNB may transmit a NACK (negative acknowledge) on the PHICH 4 sub-frames after the UE transmitted at 1035.

At 1040, the UE has entered a discontinuous transmission (DTX) cycle. Thus, unlike normal HARQ as described above in FIG. 9, the UE does not transmit at 1040. Note that the term "DTX" refers to "discontinuous transmission" and refers to a low power mode where the UE is silent and does not transmit during specified times or intervals. DTX is present in several wireless standards such as UMTS, LTE (Long-term evolution), WiMAX, etc. The term "DTX" is explicitly intended to at least include the full extent of its ordinary meaning, as well as similar types of modes in future standards.

At 1045, the eNB may transmit another NACK on the PHICH. In response, the UE may send data using another redundancy version (RV 1) at 1050. Note that the interval between transmissions for the eNB remains 4 sub-frames and the eNB maintains a RTT of 8 sub-frames, similar to the standard timeline. However, since the UE may alternate between UL PUSCH transmissions and DTX, the interval between 2 UL transmissions for the UE may be extended to 16 sub-frames as shown in FIG. 10 without violation of the UL timeline described above in FIG. 9.

Note that, as described above, the UE may notify the eNB that the UE is peak current limited via a RRC message. Additionally, the UE may indicate the number of DTX cycles between HARQ transmissions. Thus, in some embodiments, the eNB may determine the parameter max-HARQ-Tx based on the number of DTX cycles between HARQ transmissions and the standard RTT. For example, in the current LTE specification, the RTT is defined as 8 ms (8 sub-frames). Thus, if the UE will spend one HARQ transmission in DTX, the eNB may determine maxHARQ-Tx by multiplying the initial value of maxHARQ-Tx by the number of HARQ transmissions the UE will be in DTX between 2 UL transmissions plus one. Thus, as shown in FIG. 10, maxHARQ-Tx would be 8 (knowing that the initial max-HARQ-Tx is 4) and the duty cycle will be determined as the number of HARQ transmissions the UE will be in DTX between 2 UL transmissions plus one times 8, which is equal to 16 ms. As another example, if the UE spends two HARQ transmissions in DTX, then maxHARQ-Tx would be 12 and the duty cycle will be 24 ms. Note that one and two HARQ transmissions spent in DTX are merely examples, and the UE may spend any of various amounts of HARQ transmissions in DTX according to the above techniques.

At 1055, the eNB may transmit another NACK on the PHICH and the UE may DTX the UL PUSCH at 1060. Accordingly at 1065, the eNB may transmit another NACK on the PHICH, and in response the UE may send the data using another redundancy version (RV 2) at 1070, 16 sub-frames after the UE's last transmission. Finally, the eNB may send an ACK on the PHICH at 1075.

Further Embodiments

In some embodiments, a method for providing improved communication performance in a cellular communication system may include a user equipment device (UE) performing transmitting a scheduling request to a base station to request uplink resources and receiving an uplink grant from the base station. Additionally, the UE may perform transmitting a plurality of redundancy versions of first information to the base station and the plurality of redundancy versions may be transmitted in non-consecutive sub-frames with a periodicity of X ms. Further, the UE may perform receiving a single acknowledge/negative acknowledge (ACK/NACK) from the base station after transmitting the plurality of redundancy versions of first information to the base station.

In some embodiments, a value of X ms may be one of a round trip time of a hybrid automatic repeat request (HARQ) or a value which corresponds to a peak current limitation of the UE. In addition, the UE may perform receiving bundle size information from the base station. The bundle size information may be used by the UE in determining a number of the plurality of redundancy versions of first information transmitted to the base station. Additionally, the bundle size information may be dynamically determined by the base station based on a quality of an uplink channel between the UE and the base station and power characteristics of the UE.

In some embodiments, the UE performing receiving the uplink grant from the base station may include receiving information specifying periodic uplink grants. In such embodiments, a periodicity of the uplink grants may be based on a bundle size and X ms and the bundle size may specify a number of the plurality of redundancy versions of first information transmitted to the base station. Further, X ms may be a periodicity of transmission of the plurality of redundancy versions of first information.

In addition, in some embodiments, the UE may also perform transmitting a sounding reference symbol in the same sub-frame as the service request in an aligned manner. In such embodiments, a duty cycle of the service request and the sounding reference symbol may be less than or equal to a duty cycle of said transmitting.

In some embodiments, a user equipment device (UE) may include at least one antenna, at least one radio, and one or more processors coupled to the at least one radio. The at least one radio may be configured to perform cellular communication using at least one radio access technology (RAT). Further, the one or more processors and the at least one radio may be configured to perform voice and/or data communications. Additionally, the one or more processors and the at least one radio may be configured to receive an uplink grant from the base station and receive bundle size information from the base station. The bundle size information may be dynamically determined by the base station based on a quality of an uplink channel between the UE and the base station and/or power characteristics of the UE. In addition, the one or more processors and the at least one radio may be configured to transmit a bundle of redundancy versions of first information to the base station and receive a single acknowledge/negative acknowledge (ACK/NACK) from the base station after said transmitting the plurality of different redundancy versions of first information to the base station. The bundle of redundancy versions may be transmitted in consecutive sub-frames and a number of the redundancy versions may be based on the bundle size information.

In some embodiments, a base station may be configured to perform wireless communication with a wireless device and may include a radio and a processing element operatively coupled to the radio. The radio and the processing element may be configured to receive information from the wireless device indicating quality of an uplink channel used for communication between the wireless device and the base station and information from the wireless device indicating power characteristics of the UE. Additionally, the radio and the processing element may be configured to dynamically determine a bundle size for TTI bundling based on the information indicating uplink channel quality and the information indicating power characteristics of the UE and transmit the bundle size to the wireless device. The bundle size may be used by the wireless device for uplink transmissions using TTI bundling.

In some embodiments, the information indicating power characteristics of the UE may indicate peak current limitations of the wireless device and may be received in a radio resource control (RRC) message of the wireless device. In addition, the information indicating uplink channel quality may be a sounding reference symbol received by the base station from the wireless device.

In some embodiments, a base station may be configured to perform wireless communication with a wireless device and may include a radio and a processing element operatively coupled to the radio. The radio and the processing element may be configured to receive a service request from the wireless device requesting uplink resources and provide a semi-persistent grant to the wireless device. The semi-persistent grant may include periodic grants to the UE based a periodicity value X and a bundle size. The periodicity value X may specify a periodicity for a plurality of redundancy versions received in non-consecutive uplink subframes by the base station from the wireless device and the bundle size may specify a number of the plurality of redundancy versions of first information received by the base station from the wireless device.

In some embodiments, a base station may be configured to perform wireless communication with a wireless device and may include a radio and a processing element operatively coupled to the radio, where the radio and the processing element may be configured to receive information from the wireless device indicating power characteristics of the wireless device and dynamically determine a maxHARQ-Tx parameter from the information. The maxHARQ-Tx parameter may indicate a maximum number of HARQ processes used in communications between the wireless device and the base station.

In some embodiments, a user equipment device (UE) may include at least one antenna, at least one radio configured to perform cellular communication using at least one radio access technology (RAT), and one or more processors coupled to the at least one radio. The one or more processors and the at least one radio may be configured to perform voice and/or data communications and receive an uplink grant from a base station. Additionally, the one or more processors and the at least one radio may be configured to transmit a first redundancy version of first information to the base station, enter a low power state after transmitting the first redundancy version of first information, and receive a first negative acknowledge (NACK) from the base station after said transmitting the first redundancy version. The low power state may configure the UE to not transmit during a specified time interval. Further, the one or more processors and the at least one radio may be configured to receive a second NACK from the base station, exit the low power state, transmit, in response to receiving the second NACK, the second redundancy version of first information to the base station, and re-enter the low power state said transmitting the second redundancy version of first information.

In some embodiment, the specified time interval may correspond to a duty cycle of the UE and the duty cycle may be based on a number of uplink transmissions the UE will remain in the low power state and a round trip time of a hybrid automatic repeat request (HARD). Additionally, the low power state may be a discontinuous transmission (DTX) cycle.

Embodiments of the present disclosure may be realized in any of various forms. For example, some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of the method embodiments described herein, or, any combination of the method embodiments described herein, or, any subset of any of the method embodiments described herein, or, any combination of such subsets.

In some embodiments, a device (e.g., a UE 106) may be configured to include a processor (or a set of processors) and a memory medium, where the memory medium stores program instructions, where the processor is configured to read and execute the program instructions from the memory medium, where the program instructions are executable to implement a method, e.g., any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A user equipment device (UE), comprising:
at least one antenna;
at least one radio, wherein the at least one radio is configured to perform cellular communication using at least one radio access technology (RAT);
one or more processors coupled to the at least one radio, wherein the one or more processors and the at least one radio are configured to perform voice and/or data communications;
wherein the one or more processors and the at least one radio are configured to:
indicate, via a radio resource control (RRC) message, that the UE has a transmission limitation, wherein the transmission limitation causes the UE to not transmit continuously in uplink (UL);
receive an UL grant on a physical downlink control channel (PDCCH) for transmission on physical uplink shared channel (PUSCH) resources assigned to the UE;
transmit data according to the UL grant on a first time portion of the PUSCH resources assigned to the UE; and
do not transmit during a specified time portion of the PUSCH resources assigned to the UE in accordance with the indicated transmission limitation.

2. The UE of claim 1,
wherein the UL grant comprises information specifying periodic UL grants.

3. The UE of claim 2,
wherein a periodicity of the UL grants is based, at least in part, on a bundle size specifying a number of a plurality of redundancy versions of the data to be transmitted.

4. The UE of claim 1,
wherein the specified time portion corresponds to a duty cycle of the UE, wherein the duty cycle is based on a number of UL transmissions the UE will remain in a low power state and a round trip time of a hybrid automatic repeat request (HARQ).

5. The UE of claim 4,
wherein the low power state is a discontinuous transmission (DTX) cycle.

6. The UE of claim 1,
wherein the data is transmitted in accordance with a sub-frame (TTI) bundle size.

7. The UE of claim 6,
wherein the sub-frame bundle size is dynamically determined at least once during the voice and/or data communications.

8. The UE of claim 7,
wherein the bundle size specifies a number of a plurality of redundancy versions of first information transmitted.

9. The UE of claim 1,
wherein the one or more processors and the at least one radio are further configured to:
  receive, in accordance with a hybrid automatic repeat request (HARQ) timeline, an acknowledgement/negative acknowledgement (ACK/NACK) of the transmission of data, wherein the ACK/NACK is a first NACK received X sub-frames after transmission of the data, and wherein the data comprises a first redundancy version of the data
  receive, 3X sub-frames after transmission of the data, a second NACK of the transmission of data; and
  transmit, X sub-frames after receipt of the second NACK, a second redundancy version of the data.

10. The UE of claim 1,
wherein the one or more processors and the at least one radio are further configured to:
  receive a first negative acknowledge (NACK) from a base station after transmission of the data, wherein the UE does not perform a retransmission of the data in response to receiving the first NACK.

11. An apparatus, comprising:
a memory; and
a processing element in communication with the memory, wherein the processing element is configured to:
  generate instructions to indicate to a base station and via a radio resource control (RRC) message, that the apparatus has a transmission limitation, wherein the transmission limitation causes the apparatus to not transmit continuously in uplink (UL);
  receive, from the base station, an UL grant on a physical downlink control channel (PDCCH) for transmission on physical uplink shared channel (PUSCH) resources assigned to the apparatus;
  generate instructions to transmit data according to the UL grant on a time portion of the PUSCH resources assigned to the apparatus; and
  generate instructions to not transmit during a specified time portion of the PUSCH resources assigned to the apparatus in accordance with the indicated transmission limitation.

12. The apparatus of claim 11,
wherein the UL grant received from the base station comprises information specifying periodic UL grants; and
wherein a periodicity of the UL grants is based, at least in part, on a bundle size specifying a number of a plurality of redundancy versions of the data to be transmitted to the base station.

13. The apparatus of claim 11,
wherein the specified time portion corresponds to a transmission duty cycle of the apparatus, wherein the duty cycle is based on a number of UL transmissions the apparatus will remain in a low power state and a round trip time of a hybrid automatic repeat request (HARD), and wherein the low power state is a discontinuous transmission (DTX) cycle.

14. The apparatus of claim 11,
wherein the data is transmitted in accordance with a sub-frame bundle size, wherein the sub-frame bundle size is dynamically determined at least once during voice and/or data communications.

15. The apparatus of claim 14,
wherein the bundle size specifies a number of a plurality of redundancy versions of first information transmitted to the base station.

16. The apparatus of claim 11,
wherein the processing element is further configured to:
  receive, in accordance with a hybrid automatic repeat request (HARD) timeline, an acknowledgement/negative acknowledgement (ACK/NACK) of the transmission of data, wherein the ACK/NACK is a first NACK received X sub-frames after transmission of the data, and wherein the data comprises a first redundancy version of the data;
  receive, 3X sub-frames after transmission of the data, a second NACK of the transmission of data; and
  generate instructions to transmit, X sub-frames after receipt of the second NACK, a second redundancy version of the data.

17. A non-transitory computer readable memory medium storing program instructions executable by a processor of a user equipment (UE) to:
  indicate, to a base station and via a radio resource control (RRC) message, that the UE has a transmission limitation, wherein the transmission limitation causes the UE to not transmit continuously in uplink (UL);
  receive, from the base station, an UL grant on a physical downlink control channel (PDCCH) for transmission on physical uplink shared channel (PUSCH) resources assigned to the UE;
  generate instructions to transmit, to the base station, data according to the UL grant on a time portion of the PUSCH resources assigned to the UE; and
  generate instructions to not transmit during a specified time portion of the PUSCH resources assigned to the UE in accordance with the indicated transmission limitation.

18. The non-transitory memory medium of claim 17,
wherein the specified time portion corresponds to a duty cycle of the UE, wherein the duty cycle is based on a number of UL transmissions the UE will remain in a low power state and a round trip time of a hybrid automatic repeat request (HARD), and wherein the low power state is a discontinuous transmission (DTX) cycle.

19. The non-transitory memory medium of claim 17,
wherein the data is transmitted in accordance with a sub-frame bundle size, wherein the sub-frame bundle size is dynamically determined at least once during voice and/or data communications, and wherein the bundle size specifies a number of a plurality of redundancy versions of first information transmitted to the base station.

20. The non-transitory memory medium of claim 17, wherein the program instructions are further executable to receive, from the base station, a first negative acknowledge (NACK) after transmission of the data, wherein the UE does not perform a retransmission of the data in response to receiving the first NACK.

* * * * *